US012715756B2

(12) United States Patent
Jochman

(10) Patent No.: US 12,715,756 B2
(45) Date of Patent: Aug. 25, 2026

(54) SYSTEMS AND METHODS FOR INTEGRATED FUEL FILL VENT VALVE AND FUEL FILLING AND VAPOR CONTROL

(71) Applicant: Illinois Tool Works Inc., Glenview, IL (US)

(72) Inventor: Nathan Joe Jochman, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 85 days.

(21) Appl. No.: 18/485,839

(22) Filed: Oct. 12, 2023

(65) Prior Publication Data

US 2024/0124294 A1 Apr. 18, 2024

Related U.S. Application Data

(60) Provisional application No. 63/416,264, filed on Oct. 14, 2022.

(51) Int. Cl.
*B67D 7/36* (2010.01)
*B67D 7/04* (2010.01)

(52) U.S. Cl.
CPC ............ *B67D 7/048* (2013.01); *B67D 7/362* (2013.01)

(58) Field of Classification Search
CPC .. B67D 7/048; B67D 7/362; B60K 15/03519; B60K 15/035; B60K 15/03504; B60K 15/0358
See application file for complete search history.

(56) References Cited

U.S. PATENT DOCUMENTS 4,625,777 A * 12/1986 Schmidt ................ B60K 15/04 141/286
5,054,528 A * 10/1991 Saitoh .................... B60K 15/04 141/59
2002/0112763 A1* 8/2002 Romanek ............... B60K 15/04 137/588

* cited by examiner

*Primary Examiner* — Jason K Niesz
(74) *Attorney, Agent, or Firm* — McAndrews Held & Malloy, Ltd.

(57) ABSTRACT

An example fluid container with multiple sections to receive a fluid as well as vapor displaced by addition of the fluid is disclosed. In some examples, a controllable vent selectively connects one or more vapor volumes to balance pressure in the system.

8 Claims, 4 Drawing Sheets

SYSTEMS AND METHODS FOR INTEGRATED FUEL FILL VENT VALVE AND FUEL FILLING AND VAPOR CONTROL

CROSS REFERENCE TO RELATED APPLICATIONS

This application is a Non-Provisional Patent Application of U.S. Provisional Patent Application No. 63/416,264 entitled "Systems And Methods For Integrated Fuel Fill Vent Valve And Fuel Filling And Vapor Control" filed Oct. 14, 2022, which is herein incorporated by reference in its entirety.

BACKGROUND

Conventional engine driven systems include integrated fuel tanks or other fuel container that must be filled with fuel periodically. Typically, a fuel inlet or neck is provided with an opening of a sufficient size to allow vapor to flow from the fuel inlet during a fueling operation. However, the user must constantly monitor the fuel level to prepare for shutoff, and fuel vapor is lost to the environment. A system that provides a versatile and simple fueling that automatically prevents overfilling and limits escape of fuel vapor from the system is therefore desirable.

SUMMARY

Systems and methods are disclosed of a fluid container with multiple sections to receive a fluid as well as vapor displaced by addition of the fluid. In some examples, a controllable vent selectively connects one or more vapor volumes to balance pressure in the system, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
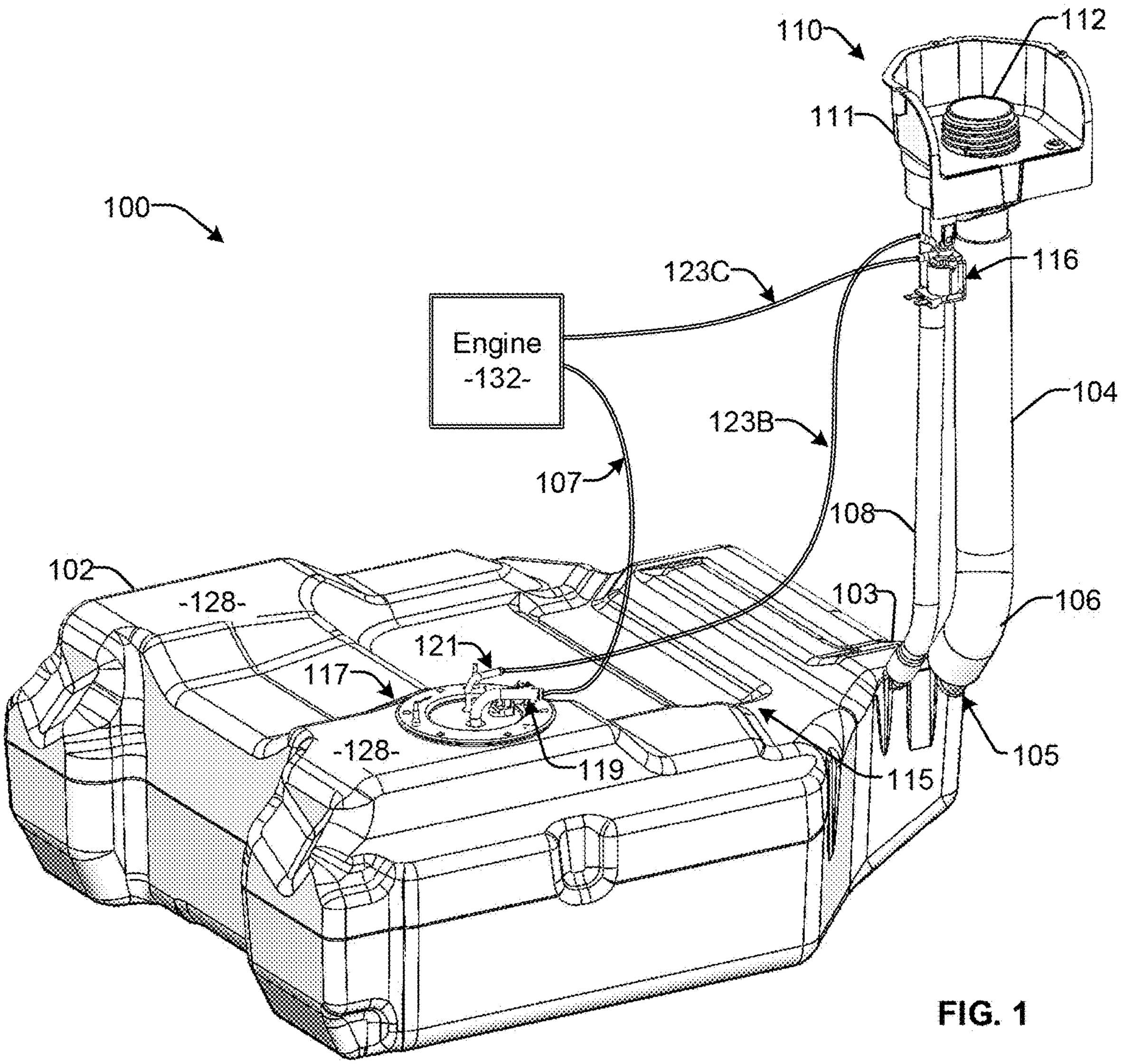
FIG. 1 illustrates an example fluid container system, in accordance with aspects of this disclosure.

Disclosed are examples of a fluid container configured to hold a fluid, the fluid container having a first section corresponding to a representative fill level for the fluid, a second section corresponding to a first volume above the fill level, and third section corresponding to a second volume above the fill level. In some examples, the fluid container is configured to receive a fluid from a fuel fill housing assembly configured to connect multiple vapor volumes, including first and second volumes and a vapor chamber within the assembly, via a controllable vent valve.

Some conventional engine driven welding equipment employs a one-piece fuel tank design. The fuel tank commonly has a relatively large fuel neck (relative to a diameter of a fuel nozzle, for instance) that allows filling without secondary vent devices or passageways. The large neck takes up a large amount of space in an enclosure of the equipment, making it difficult to package the equipment efficiently and/or to reduce an overall size of the equipment and/or related machinery.

The large fill neck often results in a volume to hold vapor near the fuel fill opening. This volume is used in the fuel system to allow the liquid fuel to expand with temperature changes, thereby providing space for vapor that is displaced within the system. The volume also allows the vent system to pass or route vapor (in this instance, only vapor) to the engine. Without such a dedicated vapor volume, liquid fuel could enter such a vent system, and on to the engine, which has a negative impact on engine performance (e.g., causing starting and/or running issues).

In some examples, well designed and vented fuel tanks maintain a vapor volume within a predetermined range (e.g., about 7% or greater relative to the volume of the fuel tank). This allows for fuel expansion and prevents liquid fuel from entering the vent system. This vapor volume should be maintained even when filling (or overfilling) the fuel tank with fuel. Existing designs commonly rely on a user to visually monitor fuel level at the point of filling, and to stop filling at a specified or marked level to maintain this vapor volume. However, such visual or other indicators may be difficult to see or follow, and users may misunderstand and/or disregard such information and overfill the fuel tank, resulting in engine running or starting issues.

The disclosed systems and methods overcome these challenges by employing a fuel tank (e.g., a fluid container) with a trapped air or vapor volume that is controlled by a vent valve to maintain a desired fuel vapor volume (e.g., about 5-10%) in the fuel tank.

In some examples, the fuel container is designed with one or more first sections corresponding to a representative fill level for the fluid. In other words, when the fuel container is full, the first section of the container has a top that represents a desired fill line for the fluid. Adjacent the first section is one or more second sections corresponding to a first vapor volume. The first vapor volume exists above the fluid fill level, as a top of the second section is higher than the top of the first section.

Adjacent the first section and opposite the second section are one or more third sections corresponding to a second vapor volume above the fill level. One or both of the first or second vapor volumes serve to trap air in these elevated sections of the fluid container when filled with liquid.

In some examples, a fuel vapor vent tube connects the first or second sections to a fuel fill housing assembly designed to accept liquid fuel from an automated fill nozzle or from a funnel. During filling, the fluid container will fill with liquid until the top of the lower part of the container (e.g., the top of the first section) is reached. At this point, the liquid fuel has displaced any vapor in the first section of the container and trapped the vapor in the first or second vapor volumes. In some examples, the liquid fuel then backs up in a filler neck or tube, causing a level of liquid fuel in the filler neck to rise. As the liquid fuel level rises, it may reach an indicator to inform the user that the fluid container cannot accept additional fuel, that filling is complete, and/or activate a mechanism operable to halt the fueling operation. For instance, a nozzle delivering liquid fuel may include an automatic port shut-off, causing an automatic fuel source to stop providing liquid fuel to the nozzle.

In some examples, the fuel is introduced to the fuel neck via a fuel fill housing assembly. The assembly may employ a housing to include a first portion, such as a fuel fill opening, to receive a fluid. A second portion below fuel fill opening defines a chamber or volume operable to channel the fluid to the fuel neck, and/or to contain vapor.

A vent standpipe extends into the second portion, the vent standpipe being connected to a controllable valve to channel vapor to the chamber. For example, the controllable valve includes a first vent valve port connected to the vent standpipe, a second vent valve port to channel vapor to another vapor port (e.g., an engine vapor port), and/or a third vent valve port connected to the fluid container (e.g., at a fluid container vapor port connected to the first vapor volume).

In some examples, the controllable valve includes a plunger to close one or more of the first, second and/or third vent valve ports to one or more of the other ports (e.g., in a closed position), and to connect the first, second and/or third vent valve ports (e.g., in an open position). Thus, by employing the controllable valve, the disclosed systems and methods can selectively and/or automatically channel and/or redirect vapor throughout various components in the system (e.g., the fluid container, the fill assembly, the engine) as vapor is displaced by liquid fuel.

Advantageously, this prevents vapor build-up in any given component, and provides a vent valve system to prevent overfilling issues with the fuel vent system and engine. Further, the disclosed vent valve system provides a single valve to perform two tasks—allowing vapor/fuel exchange in the fluid container (e.g., at the fuel fill assembly) and blocking vapor to the engine during shutdown (e.g., via the vent valve). The disclosed system further improves the filling experience by not requiring the user to watch for a maximum fuel fill level.

As used herein, the terms "welding-type system" and/or "welding system," includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the terms "welding-type power" and/or "welding power" refer to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the terms "first" and "second" may be used to enumerate different components or elements of the same type, and do not necessarily imply any particular order.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, the terms "welding parameter" includes one or more of voltage, current, power, wire feed speed, gas flow rate, pulse rate, workpiece thickness, workpiece material type, electrode type, welding process, travel speed, arc length, or joint type, as a list of non-limiting examples.

The term "power" is used throughout this specification for convenience, but also includes related measures such as energy, current, voltage, resistance, conductance, and enthalpy. For example, controlling "power" may involve controlling voltage, current, energy, resistance, conductance, and/or enthalpy, and/or controlling based on "power" may involve controlling based on voltage, current, energy, resistance, conductance, and/or enthalpy.

As used herein, the term "valve" includes any of numerous mechanical devices by which the flow of liquid, gas, or loose material in bulk may be started, stopped, or regulated by a movable part that opens, shuts, or partially obstructs one or more ports or passageways, which further includes the movable parts of such a device.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW), shielded metal arc welding (SMAW), spray, short circuit, and/or any other type of welding process.

FIG. 1 is a block diagram of an example fluid container system 100. As shown, the system 100 includes a fluid container 102 configured to receive a fluid at a fuel fill housing assembly 110 and via a filler neck 104. As shown, the filler neck 104 is configured to channel the fluid from cap attachment or opening 112 into the fluid container 102. The filler neck 104 is coupled to the fuel container 102 at port 105 via a flexible hose 106, which can be formed of one or more of rubber, a polymer, or a composite material, for example.

In the illustrated example, the fuel container 102 is designed with one or more first sections 115 corresponding to a representative fill level for the fluid. In other words, when the fuel container is full, the fluid reaches a top of the first section 115 of the container 102, thereby representing a desired maximum fill line for the fluid. Adjacent the first section 115 is one or more second sections 128 corresponding to a first vapor volume that is formed above the fluid fill level, as a top of the second section 128 is higher than the top of the first section 115.

Adjacent the first section 115 and opposite the second section 128 are one or more third sections 103 corresponding to a second vapor volume that exists above the fill level (e.g., the top of the first section 115). One or both of the first or second vapor volumes serve to trap air in these elevated sections of the fluid container 102 when filled with liquid, such that air/vapor displaced by the filling operation can be captured therein.

In the example of FIG. 1, an opening or interface can be fitted with a plate 117 to secure one or more of a fluid/fuel output port 119 and/or a fluid container vapor port 121. The fluid output port 119 is connected to an engine 132 via conduit 107, and provides fuel to the engine 132 to support combustion. The fluid container vapor port 121 is connected to a controllable vent valve 116 via conduit 123B to allow displaced vapor to pass to the vent valve 116 (described in detail with regard to FIGS. 2A and 2B). Another vapor conduit 123C connects the engine 132 to the vent valve 116.

In some examples, a fuel vapor vent tube 108 connects the second or third sections to the fuel fill housing assembly 110, designed to accept liquid fuel from an automated fill nozzle or from a funnel. During filling, the fluid container 102 will fill with liquid until the top of the lower part of the container (e.g., the top of the first section 115) is reached. At this point, the liquid fuel has displaced any vapor in the first section 115 of the container and trapped the vapor in the first or second vapor volumes.

The fuel vapor vent tube 108 connects to a portion of the filler neck 104 distal to the flexible tube 106 via a port 118. For example, the fuel vapor vent tube 108 can connect directly onto the port 118, and/or be coupled via a vent valve or valve coupling 116. In some examples, the vent valve 116 is passive or mechanically controlled (e.g., in response to experiencing a threshold pressure), whereas in some examples the vent valve 116 is electronically controlled (e.g., via a controller).

Figure 2A:
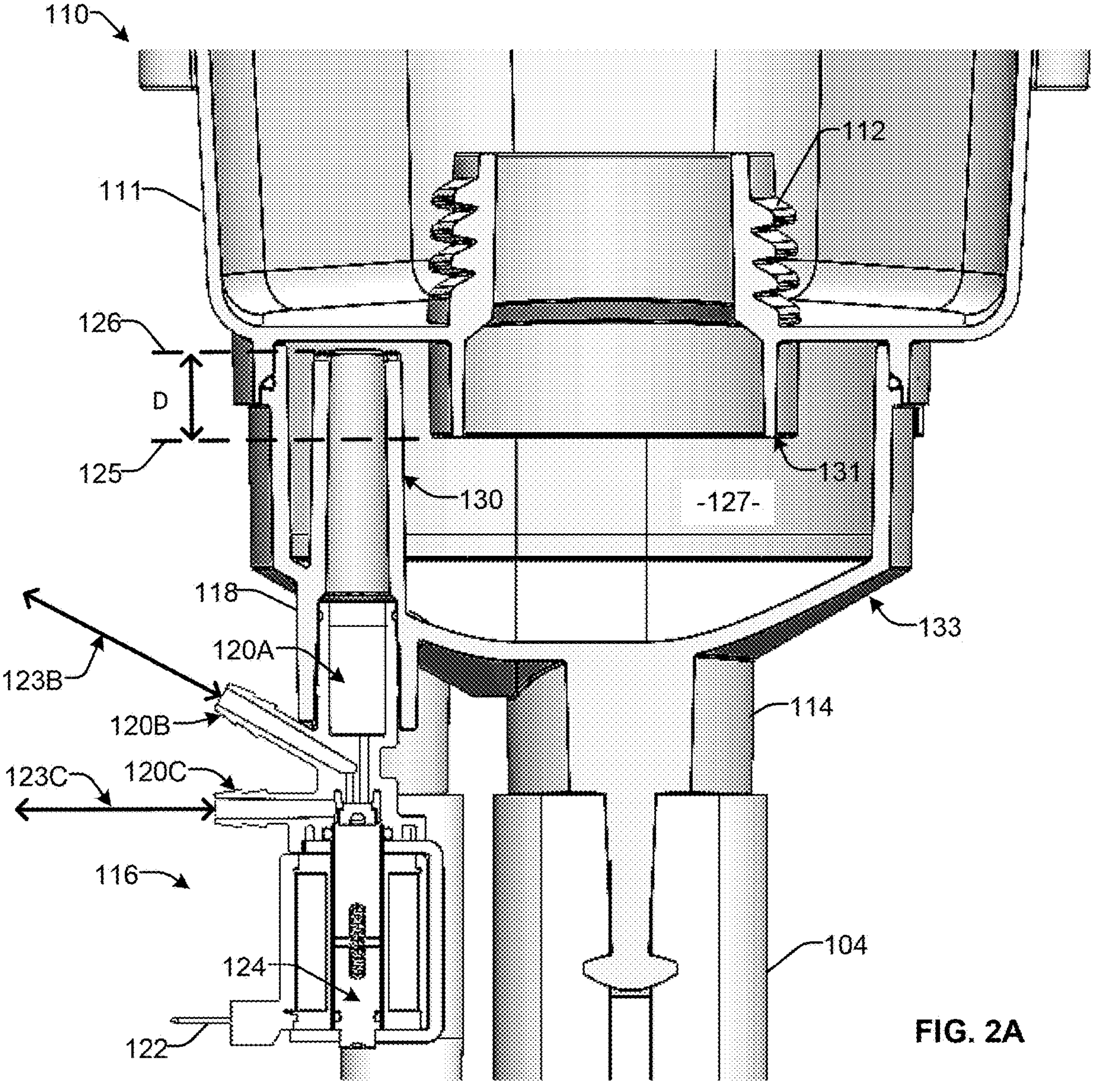
FIGS. 2A and 2B illustrate an example fuel fill housing assembly and controllable valve, in accordance with aspects of this disclosure.
Figure 2B:
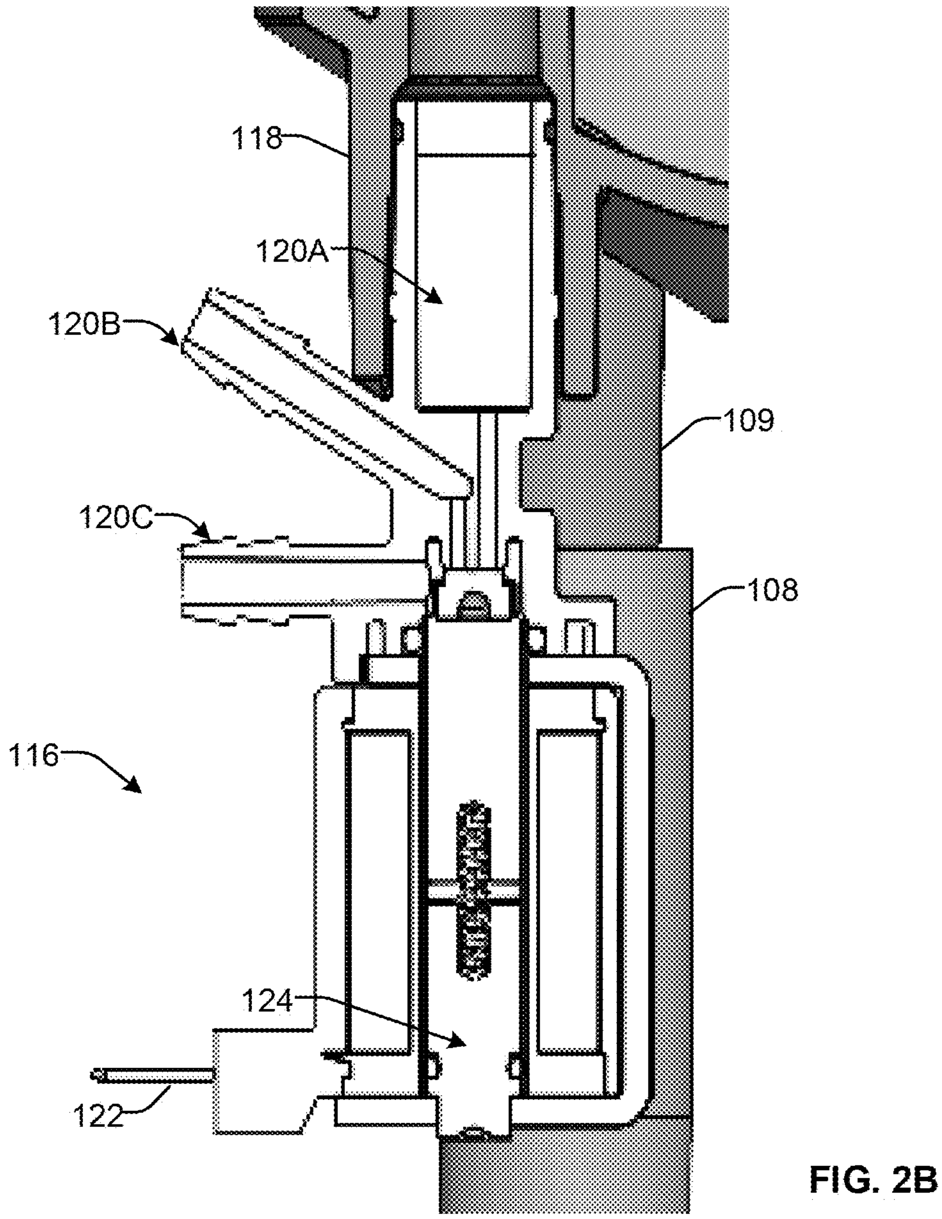

FIGS. 2A and 2B illustrate the example fuel fill assembly 110. As shown, the vent valve 116 includes three passages (e.g., vent valve ports) and is connected to the fuel fill housing assembly 110. The fuel fill housing assembly 110 has a first, or upper, portion 111 and a second, or lower, portion or chamber 127. The upper portion 111 contains the cap attachment 112, and possibly a skirt, to block splashing fuel from a vent standpipe 130. The chamber 127 has a funnel shape 133 for fuel filling, the vent standpipe 130 (connected to valve 116) for vapor removal, and a valve attachment port 118 at the bottom of the vent standpipe 130.

A first vent valve port 120A of the controllable valve 116 is connected to the chamber 127 via port 118. Secondary vent valve ports 120B and 120C are similar ports that extend from the vent valve 116 as hose barbs. The vent valve ports 120B and 120C are configured to receive hoses 123B and 123C, respectively. In examples, vent valve port 120C connects to an engine vapor port (not shown) and the other to the fuel tank vapor port 121 in the second section 128. In a closed position, the valve 116 blocks flow from any vent valve port to any other vent valve port, and therefore all ports are closed. In an open position, the valve 116 allows vapor to flow from any vent valve port to any other vent valve port, such that all vent valve ports are open to each other vent valve port. In this example, when the controllable valve 116 is open, the vent valve ports can receive and/or transmit vapor from any other vapor volume in the fuel system 100, including the second section 128, the chamber 127, and/or the engine 132.

In some examples, the fuel vapor vent valve 116 is electronically controlled and is operated by a welder or an engine controller. For example, one or more electrical leads can be connected to vent valve 116 via electrical contacts 122. In some examples, the valve 116 is normally in the closed position, such that without application of electrical current, a plunger 124 arranged within the valve 116 blocks all of the vent valve ports. When electrical current is applied, the valve 116 is energized and the plunger 124 is thrust into an open position.

Fueling is commonly performed with the engine off. The vent valve 116 is in the de-energized state when the engine is off. Thus, as fuel filling occurs with a closed vent valve, fuel vapor is trapped in the higher part of the fuel tank second section 128, forcing the fuel system to retain a vapor volume. After the filling is complete, the vent valve 116 will energize if the unit is started, thereby opening the vent valve ports to each other. For example, the valve 116 opens in response to a start signal, expiration of a timer, and/or an engine parameter reaching a predetermined threshold level (e.g., a desired oil pressure, operating temperature, speed, etc.).

At start-up of the system, the air and/or vapor trapped in the second section 128 of the fluid container 102 is pushed up to the top of the tank due to buoyancy of the vapor. Likewise, any liquid fuel in the filler neck 104 will drop down into the fluid container 102 as the vapor space is vented to the fuel filler assembly 110, which is higher up than the fluid container 102. The exchange of vapor and fuel allows any liquid fuel to fall to the fluid container 102 and maintains a minimum vapor needed for fuel expansion and to prevent liquid fuel from entering the vent port on the engine. With the vapor now free to flow through the fuel fill assembly 110, the vent valve port 120C is also open, which allows any excessive vapor to bleed off to the engine vapor port.

Upon engine shut down, the vent valve 116 closes, preventing vapor from flowing to the engine 132 and therefor preventing the engine from running on (i.e. dieseling). This provides a consistent and safe shutdown.

With the unit off, the tank vapor is prevented from being used by the engine 132 and is trapped in the fluid container 102. To prevent overpressure, the fuel cap has a relief valve that vents vapor when upper and lower pressure thresholds are violated (e.g., 0.5 to 1.5 psi).

As a result, the disclosed fluid container 102, vent valve 116, and routing design work together to produce a more consistent and worry-free fuel fill experience, and thereby better operation of the welder.

In some examples, the fuel vent valve 116 may be connected (e.g., mechanically and/or electrically coupled) to a mechanical actuator. For instance, the mechanical actuator is configured to move (e.g., change in position and/or orientation) the plunger 124 of the fuel vent valve 116 in response to the change in position or orientation of the mechanical actuator, thereby adjusting venting from the fuel container via the fuel vapor vent tube.

In some examples, the fuel vent valve 116 may be connected (e.g., mechanically and/or electrically coupled) to control circuitry. For instance, a change in position and/or orientation of the valve may be in response to a signal received from the control circuitry.

In some examples, the disclosed fluid container system provides a fuel tank (e.g., fluid container) for an engine driven welder/generator system.

As shown in FIG. 2A, the standpipe 130 extends into the chamber 127 at an upper level 126 a height D above a level 125 corresponding to a bottom of an extension 131 of the cap attachment 112. This difference in height advantageously prevents fluid from splashing into standpipe 130 (and therefore the vapor vent 116), as well as preventing fluid flow when fluid in the chamber 127 reaches level 125, due to pressure on the fluid. Thus, even when the container 102 is overfull, and fluid backs into chamber 127, a volume of vapor is maintained within the chamber 127 above the line 125.

The fuel vapor vent tube 108 can connect directly onto a port 109, and/or be coupled via a vent valve or valve coupling (not shown). In some examples, the vent valve 116 is passive. In some examples, the vent valve 116 is electronically and/or mechanically controlled by a device 150 (e.g., a valve, mechanical actuator, mechanical lever, etc.).

Figure 3:
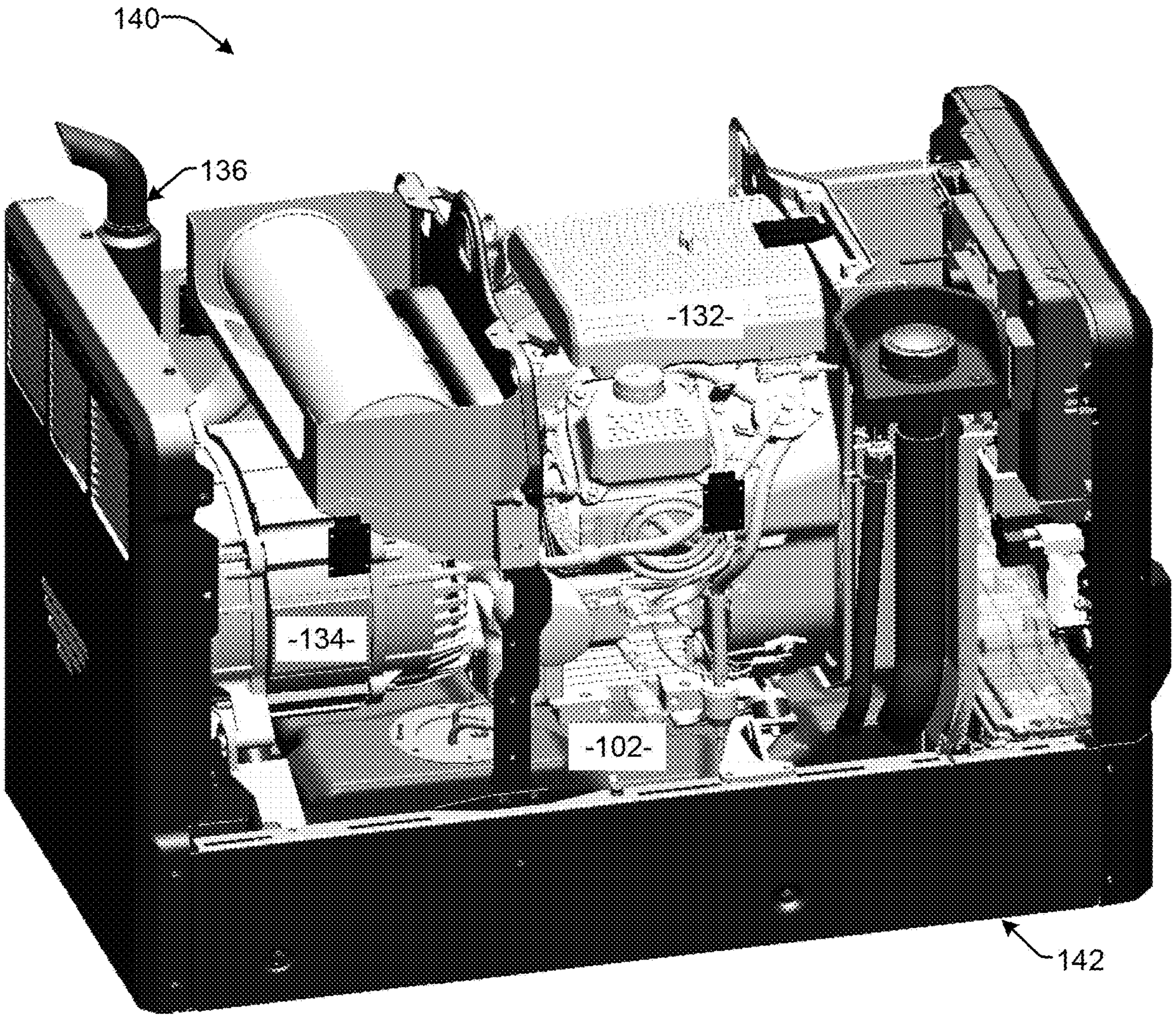
FIG. 3 illustrates the example fluid container system incorporated with an engine driven welder/generator system, in accordance with aspects of this disclosure.

FIG. 3 illustrates an example engine driven welder/generator system 140 that includes the fluid container system 100. As shown, the system 130 includes an engine 132 with a muffler 136 arranged at a first end of the engine 132. A generator 134 is coupled to the engine 132 (e.g., directly and/or via one or more transmission devices, such as a clutch, gear, and/or belt). In the example of FIG. 3, the fluid container 102 is arranged below the engine 132 and the generator 134, either to support the engine and generator, or fitted within an external housing 142. As illustrated in FIG. 3 the example system 140 can be contained within an external housing 142. As shown, the external housing 142 includes one or more panels including, but not limited to, a top panel, a base panel, a front or back panel, and one or more side panels (not shown).

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. An engine driven welder/generator system comprising:
- an engine;
- a fuel container;
- a fuel fill housing assembly extending upward from the fuel container; and
- a controllable valve coupled to the fuel fill housing assembly;
  - wherein the controllable valve comprises:
    - a first vent valve port fluidly coupled to the fuel fill housing assembly and configured to channel vapor to a chamber of the fuel fill housing assembly from a fuel container;
    - a second vent valve port fluidly coupled to the fuel container and configured to channel vapor to a first vapor port;
    - a third vent valve port fluidly coupled to the engine and configured to channel vapor to a second vapor port; and
    - a plunger configured to:
      - transition between an open position and a closed position;
      - close the first, second, and third vent valve ports to each other in the closed position; and
      - connect the first, second, and third vent valve ports to each other in the open position.

2. The engine driven welder/generator system of claim 1, wherein the first vapor port is one of an engine vapor port or a fluid container port, the second vent valve port being connected to a conduit configured to channel fuel vapor gas to or from the assembly to the engine vapor port or the fluid container port.

3. The engine driven welder/generator system of claim 1, further comprising a fuel cap configured to release vapor from the assembly when vapor pressure exceeds a predetermined threshold amount.

4. The engine driven welder/generator system of claim 1, wherein the controllable valve is further configured to:
- allow vapor to flow from the first, second, and third vent valve ports of the valve to any other of the first, second, or third vent valve ports of the valve when the plunger is in the open position; and
- block vapor from flowing from the first, second, and third vent valve ports of the valve when the plunger is in the closed position.

5. The engine driven welder/generator system of claim 1, wherein the controllable valve is an electrically controllable valve.

6. The engine driven welder/generator system of claim 5, wherein the electrically controllable valve is coupled to a controller configured to provide a signal to the electrically controllable valve to control a change in position or orientation of the valve.

7. The engine driven welder/generator system of claim 6, wherein the electrically controllable valve is operable to open upon application of an electrical current.

8. The engine driven welder/generator system of claim 6, wherein the electrically controllable valve is operable to close when no electrical current is applied.

* * * * *